United States Patent [19]

Opheij et al.

[11] Patent Number: 4,864,118
[45] Date of Patent: Sep. 5, 1989

[54] OPTICAL SCANNING UNIT WITH TRACKING ERROR DETECTION

[75] Inventors: Willem G. Opheij; Gerard E. Van Rosmalen; Gerard Van Engelen, all of Eindhoven, Netherlands

[73] Assignee: U.S. Philips Corporation, New York, N.Y.

[21] Appl. No.: 161,820

[22] Filed: Feb. 29, 1988

[30] Foreign Application Priority Data

Dec. 16, 1987 [NL] Netherlands ............... 8703041

[51] Int. Cl.⁴ ................................. G05B 1/00
[52] U.S. Cl. ................................. 250/202; 369/46; 369/111
[58] Field of Search ............ 250/201, 202; 369/46, 369/44, 111, 250

[56] References Cited

U.S. PATENT DOCUMENTS

| 4,123,652 | 10/1978 | Bouhuis | 369/111 |
| 4,458,144 | 7/1984 | Reilly et al. | 369/46 |
| 4,532,522 | 7/1985 | Tsunoda et al. | 369/44 |
| 4,695,992 | 9/1987 | Aoi | 250/201 |
| 4,747,090 | 5/1988 | Yamashita et al. | 369/46 |

FOREIGN PATENT DOCUMENTS 54-013310 1/1979 Japan.
58-183484 1/1983 Japan.
58-100244 6/1983 Japan.
58-200440 11/1983 Japan.

Primary Examiner—David C. Nelms
Assistant Examiner—Michael Messinger
Attorney, Agent, or Firm—Algy Tamoshunas; Leroy Eason

[57] ABSTRACT

A scanning unit for an optical disc record carrier includes a radiation-sensitive detection system having a plurality of detection elements on which is formed a reflected image of the scanning spot on the track structure of the record carrier. A tracking error signal is derived by combining the output signals of detection elements situated on respective sides of a boundary line between two halves of the detection system, and comparing with each other the combined signals from both halves. Several different such tracking error signals are derived, for boundary lines having different orietations with respect to the direction of the track instantaneously being scanned. The tracking error signal corresponding to a boundary line most nearly parallel to the direction of such track will be of greatest amplitude, and is selected as the tracking error signal used for controlling the scanning unit to follow the center line of such track. This achieves improved tracking error sensitivity providing more accurate tracking over the entire track structure.

6 Claims, 2 Drawing Sheets

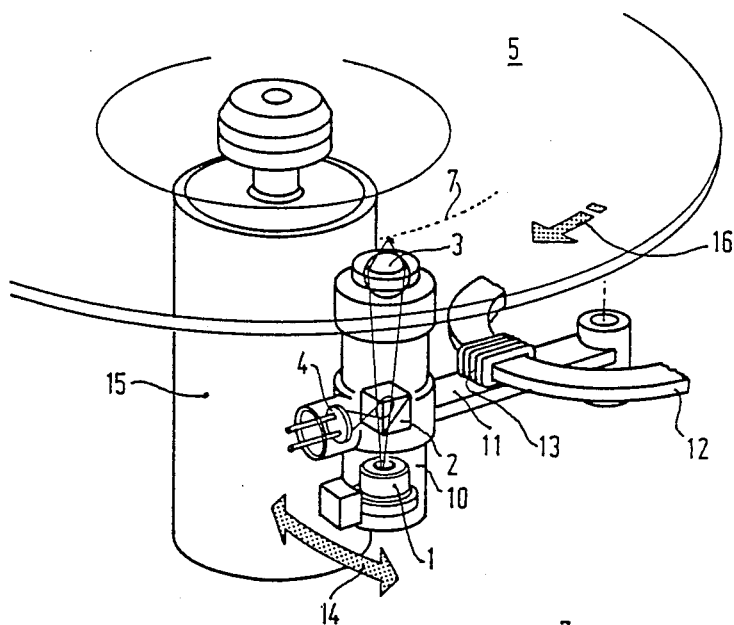
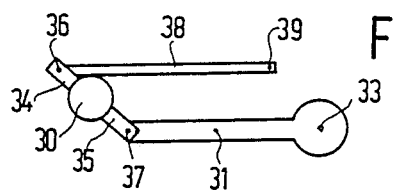
FIG. 3a
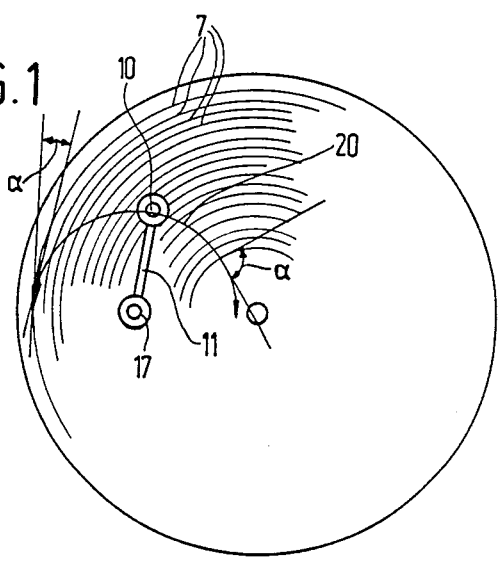
FIG. 2
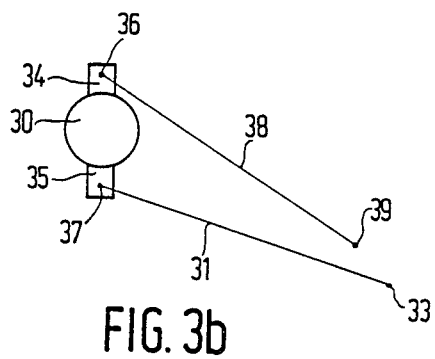
FIG. 3b

OPTICAL SCANNING UNIT WITH TRACKING ERROR DETECTION

BACKGROUND OF THE INVENTION

1. Field of the Invention

The invention relates to an optical scanning unit for scanning an information track on an optically readable record carrier, during which scanning the orientation of the scanning unit changes with respect to the direction of the instantaneously scanned track portion. Such scanning unit includes a radiation source, a radiation-sensitive detection system and an optical system for focusing a scanning beam supplied by the radiation source to form a scanning spot on the record carrier and for imaging the reflected scanning spot on the radiation-sensitive detection system. The detection system comprises a plurality of radiation-sensitive detection elements situated on either side of a bounding line and each supplying an electric output signal which is dependent on the intensity of the radiation incident on the detection element, the difference between the output signals of the detection elements on either side of the bounding line being representative of the magnitude and the direction of a deviation between the center of the scanning spot and the center line of the information track. The invention also relates to an apparatus for reading and/or writing information in an optically readable record carrier.

2. Description of the Related Art

A scanning unit of this type and a read and/or write apparatus of this type are known from U.S. Pat. No. 4,533,826 (PHN 10361). The scanning unit described therein comprises a focusing error detection system combined with a tracking system for reading an optical record carrier.

In such known unit it is ensured that the intensity distribution of the scanning spot image formed in the plane of the radiation-sensitive detection system will be symmetrical with respect to two detectors, if the center of the scanning spot in the information plane is situated on the center line of the scanned track. If the scanning spot moves transversely to the track direction, the intensity distribution on the two detectors changes, producing a difference between their output signals. Consequently, by subtracting the output signals from each other a difference signal is obtained which represents the magnitude and the sign of the tracking error and which can be used to correct the position of the scanning unit and hence the scanning spot with respect to the scanned track.

The information surface may have an information structure consisting of a single continuous track in the form of, for example, a spiral on a disc-shaped record carrier, or a plurality of successive tracks which can be successively scanned by the scanning unit and are, for example, concentric circular tracks on such a record carrier.

To enable the scanning spot to scan the entire spiral track or all concentric tracks, it must be possible to move the spot transversely to the track direction, i.e. in the radial direction in the case of a disc-shaped record carrier. If the optical scanning unit has a sufficiently light construction, that is to say, the assembly of elements for forming a scanning spot on the information surface and converting the radiation reflected from the information surface into electric signals, this movement of the scanning spot can be realized by moving the entire optical scanning unit in the radial direction. However, driving means actually used in practice for the optical scanning unit is a pivotal arm which has the scanning unit secured to its end, so that the scanning unit follows a circular path which crosses the track in the information surface at a constantly different angle. Such movement of the pivotal arm causes the bounding line between the detection elements which generate the tracking error signal to rotate with respect to the track direction or, in other words, the effective track direction will extend, for example, at an increasing or decreasing angle to the bounding line as the scanning unit moves across the information surface. The effective track direction is the direction of the projection of the instantaneously scanned track portion in the plane of the detection system. The result of the increase of the angle between the effective track direction and the bounding line is that the difference between the output signals of the detection elements on either side of the bounding line, which difference is associated with a given tracking error, becomes smaller. Due to the tracking error signal becoming smaller, the radial position of the scanning spot is corrected less accurately, and moreover the sensitivity to interference from scratches on the record carrier or other surface inaccuracies will increase.

The above-mentioned phenomenon may become a problem if, in order to achieve a further reduction in size of optical scanning devices, shorter pivotal arms are to be used resulting in an increase of the maximum angle between the effective track direction and the bounding line between the detection elements.

SUMMARY OF THE INVENTION

It is an object of the invention to provide a scanning unit enabling a sufficiently large and sufficiently accurate tracking error signal to be generated even when the angle between the path of the scanning unit and the optically readable track changes considerably.

To this end the optical scanning unit according to the invention is characterized in that it comprises means for at least partly compensating for the non-parallelism of the effective track direction and the direction of the bounding line. The compensation means enable the bounding line to take up different positions so as to follow the rotational movement of the effective track direction for the greater part of such movement.

A first embodiment of the optical scanning unit according to the invention is characterized in that such compensating means are constituted by mechanical securing means which produce a compensating movement of the scanning unit in such a way that during scanning the bounding line remains directed mainly parallel to the effective track direction. By rotation of at least a part of the scanning unit, the direction of the bounding line can then be adapted to the direction of the image of the track. Such a rotation may for example, be made dependent on the position of the suspension mechanism or the pivotal arm.

This embodiment of the optical scanning unit according to the invention is further characterized in that the scanning unit is suspended at one end from two arms end pivotally engaging two pivots mounted on the scanning unit and at the other end pivotally engages two stationary pivots attached to the frame of the write or read apparatus. By suitable choice of the length of the arms and the mutual distance between the pivots the rotation of the scanning unit with respect to the direction of the information track can be compensated.

An elaboration of the inventive concept is embodied in the optical scanning unit according to the invention which is characterized in that the compensation means are present within the scanning unit and are constituted by the radiation-sensitive detection system comprising a plurality of detection elements and by an electronic circuit comprising two sub-circuits. The first sub-circuit combines the output signals of the detection elements in several different ways to obtain a plurality of tracking error signals each corresponding to a different orientation of the bounding line, and the second sub-circuit selects the strongest tracking error signal. Since the different detection elements can be combined by means of an electronic circuit, it is possible to change the orientation of the bounding line with respect to the effective track direction. Such a solution is less costly than a mechanical construction.

The optical scanning unit according to the invention is further characterized in that the detection elements are combined in the radiation-sensitive detection system in such a way that bounding lines between detection elements extend radially from a central point. In this embodiment the detection elements are arranged around such central point, and may have different widths. Dependent on different functions which must be fulfilled by the detection system simultaneously with the tracking process, further bounding lines may be provided between detection elements, for example, several detection elements may be juxtaposed in the radial direction.

This embodiment of the optical scanning unit according to the invention is further characterized in that the detection elements of the radiation-sensitive detection system are in four quadrants and in that two of the quadrants each comprise at least two detection elements, said two quadrants being diametrically arranged relative to each other. Such a radiation-sensitive detection system composed of four quadrants is used, for example, in a read apparatus in which focusing error of the scanning beam with respect to the information plane is determined in accordance with the so-called astigmatic method. This method is described, for example, in U.S. Patent No. 4,023,033 and can easily be combined with a tracking system according to the invention.

In a further embodiment of an optical scanning unit according to the invention the scanning spot is oscillated in a direction approximately perpendicular to the average direction of the track with an amplitude which is smaller than the dimension of the scanning spot in the information plane, said oscillation modulating the electric signals at the output of the radiation-sensitive detection system. A control circuit sets the orientation of the bounding line with the aid of the modulation intensity of the electric signals. Since the amplitude of the thus produced modulation of the electric output signal of a radiation-sensitive detection element increases as the mean radiation intensity on the element increases, it is possible to choose the optimum orientation of the bounding line in this manner.

The optical scanning unit according to the invention is further characterized in that the control circuit has a threshold to avoid repeated switching between different orientations of the bounding line. The threshold may be, for example, a minimum difference in the signal level which should exist between the modulations in detection elements on either side of the bounding line, or a minimum period during which the signal level in the one detection element is larger than in the other.

BRIEF DESCRIPTION OF THE DRAWINGS

The invention will now be described in greater detail by way of example with reference to the accompanying drawings in which FIG. 1 shows a suspension of a scanning unit to a pivotal arm for scanning a disc-shaped record carrier, FIG. 2 is a plan view of the path followed by the scanning unit with respect to the record carrier, FIGS. 3a and 3b show mechanical constructions to influence the orientation of the write or read unit.

DESCRIPTION OF THE PREFERRED EMBODIMENTS

Figures 4A, 4B, 4C:
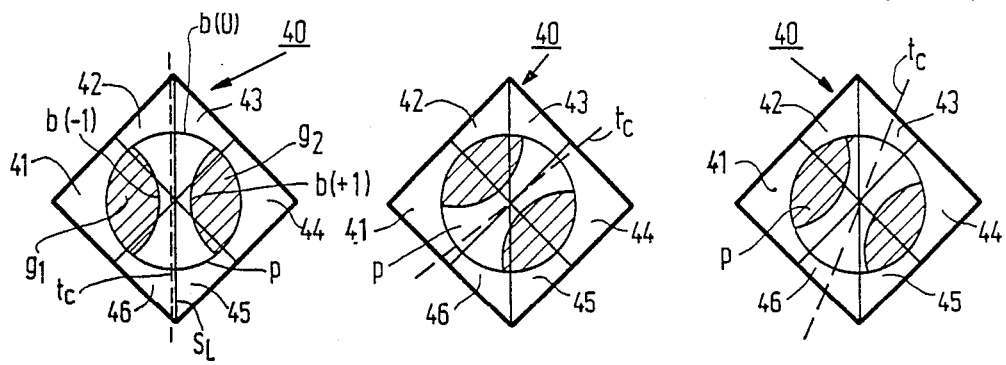
FIGS. 4a, 4b and 4c show a detection system according to the invention, comprising radiation-sensitive detection elements with the reflected image of a radiation spot.

FIG. 1 shows an optical record carrier 5, a scanning unit and means to move the scanning unit and the record carrier with respect to each other. The scanning unit shown comprises a semiconductor laser 1 generating a radiation beam which is focused via an objective system 3 to form a scanning spot on the information surface of the record carrier 5. For the sake of clarity only a single track portion 7 of the tracks in the information surface is shown. The radiation reflected by the information surface is projected on a radiation-sensitive detection system 4 by an optical system comprising the objective system 3 and the splitting cube 2. The components 1, 2, 3, and 4 of the scanning unit are arranged in a housing 10 secured to a pivotal arm 11. The pivotal arm 11 can be moved to and fro by means of the electromagnetic means 12 and 13 along a circular path as indicated by the arrow 14. The record carrier 5 is rotated by means of a motor 15 in the direction indicated by the arrow 16 and as a result of the scanning spot passing the information track 7 the radiation reflected from the information surface is modulated in accordance with the information stored in the track.

FIG. 2 is a plan view of the path followed by the scanning unit with respect to the record carrier. The disc-shaped record carrier 5 on which a plurality of track portions 7 are shown is scanned by the scanning unit whose housing 10 only is shown. The scanning unit is suspended from the pivotal arm 11 so that the scanning unit traverses a path 20 during scanning, which path constitutes a portion of a circle. The path 20 crosses the tracks on the record carrier at an angle $\alpha$ which is different in the case of different positions of the pivotal arm with the scanning unit.

The track portions 7 form part of, for example, a continuous spiral track or of a large number of concentric circular sub-tracks. In both cases the angle $\alpha$ at which the path of the scanning unit extends to the direction of the track 7 considerably varies during the movement of the scanning unit along the path 20.

To cause the scanning unit to follow the track during scanning of the record carrier, a tracking system is integrated with the scanning unit. The tracking servo-system comprises a composite radiation-sensitive detection system having detection elements grouped on either side of a bounding line. When moving the scanning spot at right angles to the track direction, the radiation intensity of the image in the detection plane of this scanning spot shifts transversely to the effective track direction, i.e. The direction of the image of the information track in the detection plane. The difference between the output signals of the detection elements on either side of the bounding line is determined by the magnitude and the direction of a deviation between the center of the scanning spot and the center line of the scanned track portion, and the by angle between the bounding line and the effective track direction. This difference signal is used to correct the position of the scanning spot with respect to the said center line, for example, by moving the read unit transversely to the center line. The sum signal of the detection elements is modulated in accordance with the information which has been read and consequently constitutes the information signal.

The tracking error signal associated with a given tracking error is a maximum if the projection of the scanned track portion in the detection plane, indicating the effective track direction in this case, coincides with the bounding line in the radiation-sensitive detection system.

If, as is shown in FIGS. 1 and 2, the scanning unit is secured to a pivotal arm, the angle between the effective track direction and the bounding line changes continuously when moving the scanning unit from the inner edge of the record carrier to the outer edge, or conversely. A construction may be chosen such that the effective track direction is parallel to the bounding line when the scanning spot, viewed in the radial direction, is situated approximately in the center of the track structure. When the scanning spot moves towards the inner edge or towards the outer edge, the angle between the effective track direction and the bounding line increases. When using a short pivotal arm, this angle at the inner or outer edge of the record carrier may become substantially 90°.

When radially moving the scanning spot from the central position to the extreme positions, the tracking error signal becomes smaller irrespective of the fact whether the scanning spot is correctly positioned with respect to a scanned track portion. Consequently the accuracy with which the tracking servosystem can maintain correct tracking will be reduced. This system will then also be more sensitive to interference such as is caused, for example, by scratches on the record carrier.

According to the invention it is ensured that the rotation of the effective track direction is followed by corresponding rotation of the bounding line to a greater or lesser extent. When moving the scanning spot in the radial direction with respect to the record carrier, this can be mechanically realized by causing the scanning unit to rotate about its axis so that also the bounding line is rotated.

FIGS. 3a and 3b show two embodiments of a suspension of the scanning unit with which the desired movements of this unit can at least partly be realized.

In FIG. 3a the scanning unit 30 is rigidly connected to two arms 34 and 35. The one arm 35 is pivotally connected to the pivotal arm 31 via a pivot 37, which pivotal arm is pivotable about a stationary pivot 33 in the read or write apparatus. The other arm 34 is also connected pivotally via a pivot 36 to an auxiliary arm 38 the other end of which is connected pivotally to a stationary pivot 39 in the read or write apparatus. The auxiliary arm 38 has a length which is equal to that of the pivotal arm 31, and the stationary pivot 39 is mounted at a distance from the pivot 33 which is equal to the distance between the pivots 36 and 37 at the scanning unit. Each of the four pivots 33, 36, 37 and 39 is situated at a vertex of a parallelogram, so that the scanning unit assumes the same orientation with respect to the line connecting the two stationary pivots 33 and 39 when rotated by the pivotal arm 31. The change of the angle between the bounding line and the effective track direction is thus considerably reduced, and is identical in the positions at the inner and outer edges of the record carrier.

The suspension of the scanning unit as shown in FIG. 3b has two arms or wires 31 and 38 which are pivotally connected at one end to the stationary pivots 33 and 39. At the other end such arms or wires are pivotally connected via the pivots 36 and 37 to the arms 34 and 35 between which the scanning unit 30 is secured.

When moving the scanning unit 30, for example, by means of magnetic means that act on a part of the housing, it simultaneously undergoes a rotation with respect to the line between the pivots 33 and 39. The length of the arms or wires 31 and 38 and the position of the pivots and 39, can be chosen so that the rotation largely compensates for the change of the angle between the bounding line and the effective track direction. Instead of single wires or arms it is alternatively possible to use a plurality of parallel wires which with some interspace are secured next to one another to the pivots in their longitudinal direction.

A second possibility of adapting the bounding line to the movement of the effective track direction is to use the radiation-sensitive detection system with the associated signal processing circuit for the purpose of determining the effective track direction. If the effective track direction is found to have a given position, the output signals of the detection elements are combined in the signal processing circuit in such a manner that effectively two detectors are obtained whose bounding line fits the effective track direction as satisfactorily as possible.

FIGS. 4a, 4b and 4c show an embodiment of a composite detection system 40 in which the bounding line can be rotated. This detection system comprises six detectors arranged in four quadrants. The detectors 41 and 44 constitute the first and the third quadrant, respectively, the detectors 42 and 43 jointly constitute the second quadrant and the detectors 45 and 46 jointly constitute the fourth quadrant.

As is known, the beam incident on a track of the information surface is diffracted by this track in the radial direction. That is to say, a non-diffracted zero-order sub-beam, two sub-beams diffracted in the +1 and −1 order, respectively, and a plurality of second and higher order sub-beams are produced. The second and higher order sub-beams largely fall outside the pupil of the objective system and may be left out of consideration. The image of the objective pupil is denoted by the circle p in FIG. 4a. If the scanning beam completely fills the pupil, the circle also represents the cross-section of the zero-order sub-beam at the area of the detection system. The shaded area $g_1$ is the area of overlap between the −1 order sub-beam b(−1) and the zero-order sub-beam, whilst in the area $g_2$ the +1 order sub-beam b(+1) and the zero-order sub-beam overlap each other.

The first-order sub-beams have a phase difference with respect to the zero-order sub-beam which does not only depend on the geometry of the track but also on the position of the scanning spot with respect to the center line of the track. If the center of the scanning spot is located on the center line of the track, the phase differences of the first-order sub-beams with respect to the zero-order sub-beam are equal. If the scanning spot is moved transversely to the track direction, the said phase differences change, namely in the opposite sense. Consequently, the intensities in the areas $g_1$ and $g_2$ also change in the opposite sense, that is to say, one of the areas will become brighter and the other will become darker, or conversely, dependent on the sign of the movement. By placing two detectors at the positions of the areas $g_1$ and $g_2$ and by determining the difference between the output signals of the detectors, the movement of the scanning spot with respect to the center line of the track can be detected or in other words, a tracking error signal can be obtained.

Since the first-order sub-beams $b(+1)$ and $b(-1)$ are diffracted through equally large but opposite angles, the areas $g_1$ and $g_2$ in the detection system are situated symmetrically relative to the projection of the center line of the track or the effective track direction $t_c$. It will be evident that the two detectors with which the intensities in the overlap areas are determined must be situated on either side of the line $t_c$. For the detection system with six detection elements shown in FIGS. 4a, 4b and 4c this means that the output signals of the detection elements must be combined in such a way that effectively two detectors are formed whose bounding line $S_L$ coincides as satisfactorily as possible with the effective track direction $t_c$.

In the situation shown in FIG. 4a which corresponds, for example, to a position of the pivotal arm such that the scanning spot is situated on the one edge of the record carrier, the signals (S) of the detection elements 41, 42 and 46 as well as those of the detection elements 43, 44, 45 must be summed and the difference of the sam signals must be determined. The tracking error signal $S_{r1}$ is then given by:

$$S_{r1} = (S_{41} + S_{42} = S_{46}) - (S_{43} + S_{44} + S_{45}).$$

FIG. 4b shows the situation in which the scanning spot is situated on the other edge of the record carrier. The overlap areas $g_1$ and $g_2$ and the effective track direction are then rotated, for example, through an angle of approximately 45° with respect to the positions in FIG. 4a. The signals of the detection elements 41, 42 and 43 as well as those of the detection elements 44, 45 and 46 can be summed to achieve that the bounding line approximately coincides with the effective track direction. The tracking error signal $S_{r2}$ is now given by:

$$S_{r2} + (S_{41} + S_{42} + S_{43}) - (S_{44} + S_{45} + S_{46}).$$

In FIG. 4c the overlap areas $g_1$ and $g_2$ and the effective track direction assume a central position corresponding to, for example, a position of the scanning spot on the record carrier half-way the inner edge and the outer edge. Then the signals $S_{r1}$ and $S_{r2}$ are approximately equally large and either may be used as a tracking error signal. In the case of a movement from this position it must be decided which of the signals $S_{r1}$ and $S_{r2}$ will be used for correction.

To make this decision, the scanning spot and the scanned track can be periodically moved in the radical direction with respect to each other with an amplitude which is considerably smaller than the diameter of the scanning spot and at a frequency which is several orders of magnitude smaller than the frequency of the information signal being read. Due to this induced periodical tracking error the tracking error signals $S_{r1}$ and $S_{r2}$ are also modulated at a low frequency component or wobble. By comparing the amplitudes of the low frequency components it can be detected which combination of detection elements yields the largest tracking error signal at a given moment and so should be selected.

Figure 5:
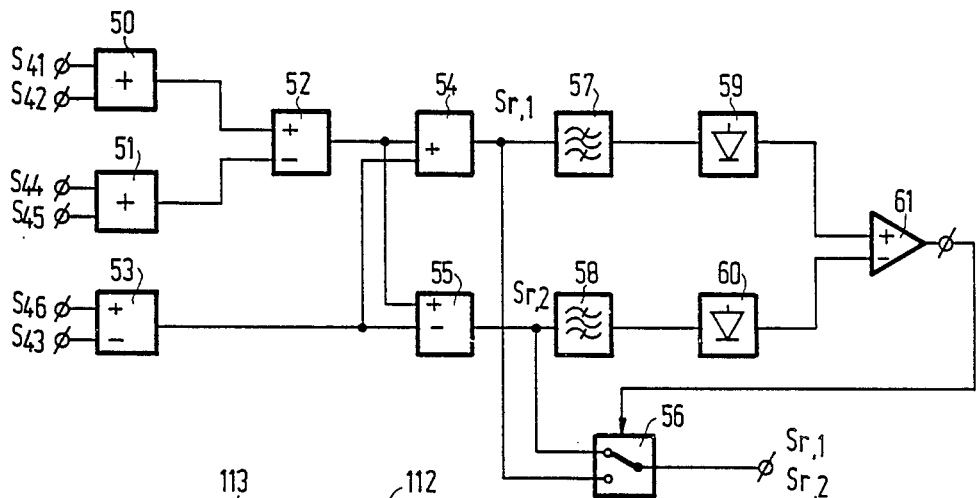
FIG. 5 is a block diagram of a circuit for forming and selecting tracking error signals.

An embodiment of an electronic circuit for forming and selecting the tracking error signals $S_{r1}$ and $S_{r2}$ is shown in FIG. 5. The signals $S_{41}$ and $S_{42}$ are applied to a first summation device 50 and the signals $S_{44}$ and $S_{45}$ are applied to a second summation device 51. The sum signals are subtracted from one another in a first subtractor circuit 52. Its output is connected to a first input of a third summation device 54. The second input thereof is connected to an output of a second subtractor circuit 53 whose inputs convey the signals $S_{46}$ and $S_{43}$. The first tracking error signal $S_{r1}$ appears at the output of the summation device 54. The second tracking error signal $S_{r2}$ is obtained by means of a third subtractor circuit 55 the two inputs of which are connected to outputs of the components 52 and 53, respectively.

The tracking error signals $S_{r1}$ and $S_{r2}$ are applied to the separate poles of a switch 56 which passes only one of these signals at any instant. For selecting one of the two signals a portion of the circuit in FIG. 5 is a control circuit wherein each signal is successively filtered by bandpass filters 57 and 58, respectively, which pass only a frequency which is equal to the wobbling frequency, and by rectifiers 59 and 60, respectively. DC signals which are proportional to the amplitudes of the wobble components of the signals $S_{r1}$ and $S_{r2}$ appear at the outputs of these rectifiers. These first and second DC components are compared in the comparator 61 which supplies, for example, a positive voltage pulse if the first DC component is larger than the second DC component and which supplies a negative pulse in the reverse case. The switch 56 is controlled by means of these pulses.

For generating a wobble component in a tracking error signal the tracks in the record carrier may have a wobbling variation. Preferably, however, the scanning spot is wobbled. To this end the entire scanning unit may be given a wobbling movement in the radial direction or an element in the scanning unit may have a small oscillating movement.

The division of the radiation-sensitive detection system into four quadrants has the advantage that a focusing error of the scanning beam on the information surface can also b e detected by means of this detection system. The beam incident on the detection system must then be rendered astigmatic, for example, by arranging a cylindrical lens in the radiation path between the objective system and the radiation-sensitive detection system. As described in U.S. Pat. No. 4,023,033 the round radiation spot on the detection system will change over to an elliptic spot when a focusing error occurs. This change of shape can be determined by means of a four-quadrant detector. The focusing error signal $S_f$ of the detector configuration of FIGS. 4a, 4b and 4c is given by:

$$S_f = (S_{41} + S_{44}) - (S_{42} + S_{43} + S_{45} + S_{46}).$$

In a modification of the detection system according to FIGS. 4a, 4b and 4c such radiation-sensitive detection system comprises more than six radiation-sensitive detection elements. When using more detection elements in the detection system, for example, the effective track direction can rotate further than is shown in the Figures without detracting from the intensity of the tracking error signal. On the other hand more detection elements also yield a better conformity between the effective track direction and the direction of the bounding line.

Figure 6:
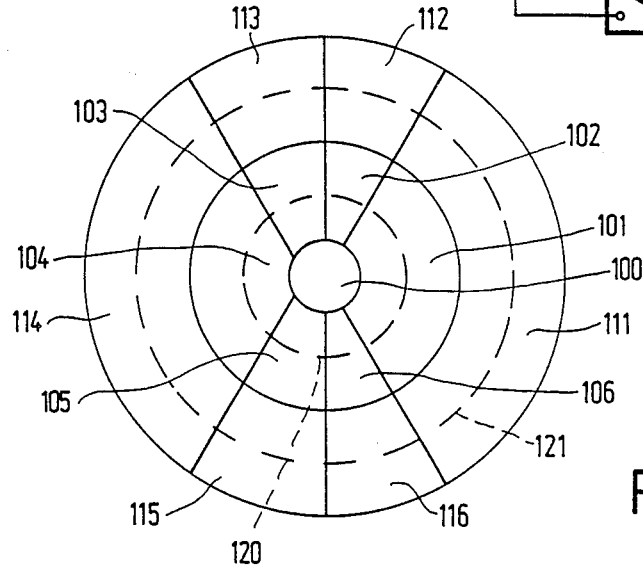
FIG. 6 shows an alternative radiation-sensitive detection system.

FIG. 6 shows an example of another division of a detection system into detection elements. The twelve detection elements shown in the Figure are grouped in two rings around a radiation-insensitive central area 100. Each of the two rings comprises six sectors 101 to 106 and 111 to 116, respectively. With this division three choices of the position of the bounding line between two halves of the radiation-sensitive detection system are possible.

A focusing error signal can also be generated with the detection system shown in FIG. 6, but in a different way than described with reference to FIGS. 4a, 4b and 4c. For example, an annular radiation spot is formed on the detection system (denoted by the broken lines 120 and 121 in FIG. 6) by a cone-shaped element in the path of the beam incident on this system, the center line of said spot coinciding, in the case of correct focusing, with the circular bounding strip between the composite annular detectors 101 to 106 on the one hand and the composite annular detectors 110 to 116 on the other hand. When defocusing the scanning beam on the information surface a circular symmetrical change of the radiation distribution over the annular detectors occurs. This change can be detected by subtracting the sum signal of detectors 101 to 106 from the sum signal of the detectors 111 to 116.

It is to be noted that in the said embodiments a signal is obtained by means of adding all detector signals, which signal represents the information read from the record carrier.

Although the invention has been described with reference to reading a record carrier on which prerecorded information is provided, it may alternatively be used in an apparatus for writing information in a record carrier having empty or blank tracks. The write apparatus principally has the same structure as the read apparatus but is also provided with known means for intensity-modulating the write beam in conformity with the information to be written.

What is claimed is:

1. An optical scanning unit for scanning an optically readable record carrier having substantially concentric information tracks thereon, during which scanning the record carrier is rotated and the angular direction of the scanning unit changes with respect to the direction of the track instantaneously being scanned, said scanning unit comprising: a radiation source, a radiation-sensitive detection system, and an optical system for focusing a scanning beam supplied by the radiation source to form a scanning spot on the record carrier producing reflected radiation therefrom and for forming such radiation into an image of the scanning spot on the radiation-sensitive detection system; said detection system comprising a plurality of radiation-sensitive detection elements situated at different positions in the image of the scanning spot and each supplying an electrical output signal which is dependent on the intensity of radiation incident thereon, the difference between the output signals of detection elements on opposite sides of a bounding line between two halves of the detection system being representative of the magnitude and direction of a tracking error between the center of the scanning spot and the center line of the information track instantaneously being scanned; characterized in that:

said scanning unit includes an electronic circuit for at least partly compensating for non-parallelism of the direction of the information track instantaneously being scanned and the direction of said bounding line, such compensating circuit comprising:
  a first sub-circuit for deriving several different combinations of the output signals of all of said detection elements, each of such combinations being a tracking error signal from detection elements situated on opposite sides of a bounding line in respectively different pre-selected directions, each of such tracking error signals being of maximum amplitude when the direction of the track instantaneously being scanned is parallel to the bounding line corresponding to such tracking error signal; and
  a second sub-circuit coupled to said first sub-circuit for selecting the strongest of said tracking error signals, such selected tracking error signal being adapted for controlling said scanning unit to maintain said scanning spot centered on the information track instantaneously being scanned.

2. An optical scanning unit as claimed in claim 1, characterized in that said first sub-circuit derives respective combinations of the output signals of detection elements on opposite sides of respectively different bounding lines extending radially from an axial center of said record carrier.

3. An optical scanning unit as claimed in claim 2, characterized in that said first sub-circuit combines the output signals of detection elements situated in four different quadrants of said scanning spot image, two of such quadrants being diametrically opposed and each including therein at least two detection elements.

4. An optical scanning unit as claimed in any of claims 1, 2 and 3, which is further adapted to oscillate said scanning spot approximately transversely to the direction of the track instantaneously being scanned and over a distance which is less than the diameter of the scanning spot, such oscillation modulating the tracking signals derived from combinations of the output signals of said detection elements; and wherein said second sub-circuit comprises a control circuit responsive to such modulated tracking signals to select the strongest tracking error signal at least partially on the basis of the amplitude of modulation of such signal.

5. An optical scanning unit as claimed in claim 4, further characterized in that said control circuit establishes a threshold for the amplitude of modulation of said tracking error signals, so that a difference in modulation amplitude which is less than said threshold does not result in selection of a different tracking error signal.

6. An apparatus for reading and/or writing information on information tracks of an optically readable record carrier, such apparatus comprising an optical scanning unit as claimed in any of claims 1, 2 and 3.

* * * * *